(12) United States Patent
Kast et al.

(10) Patent No.: US 10,113,472 B2
(45) Date of Patent: Oct. 30, 2018

(54) EXHAUST GAS TREATMENT DEVICE

(71) Applicant: Eberspächer Exhaust Technology GmbH & Co. KG, Neunkirchen (DE)

(72) Inventors: Peter Kast, Esslingen (DE); Jean Philippe Samnick, Bois d'Arcy (FR); Charles Hossepied, Courbevoie (FR); Laurent Cazeneuve, Saint Rémy l'Honoré (FR)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 15/819,354

(22) Filed: Nov. 21, 2017

(65) Prior Publication Data

US 2018/0149069 A1 May 31, 2018

(30) Foreign Application Priority Data

Nov. 25, 2016 (DE) .......... 10 2016 122 769

(51) Int. Cl.
| | |
|---|---|
| *F01N 3/10* | (2006.01) |
| *F01N 13/18* | (2010.01) |
| *B01D 53/94* | (2006.01) |
| *F01N 3/021* | (2006.01) |
| *F01N 13/14* | (2010.01) |
| *F01N 1/00* | (2006.01) |

(52) U.S. Cl.
CPC .......... *F01N 13/18* (2013.01); *B01D 53/94* (2013.01); *F01N 1/00* (2013.01); *F01N 3/021* (2013.01); *F01N 3/10* (2013.01); *F01N 13/141* (2013.01); *F01N 2240/20* (2013.01); *F01N 2470/00* (2013.01); *F01N 2470/18* (2013.01); *F01N 2490/00* (2013.01)

(58) Field of Classification Search
CPC ...... F01N 3/035; F01N 3/021; F01N 2470/18; F01N 1/084; F01N 3/2853
USPC .................................. 422/169, 176
See application file for complete search history.

(56) References Cited

U.S. PATENT DOCUMENTS

| | | | | |
|---|---|---|---|---|
| 4,663,934 A | * | 5/1987 | Sickels | F01N 3/0211 422/176 |
| 6,824,743 B1 | * | 11/2004 | Pawson | F01N 3/021 422/168 |
| 2007/0289294 A1 | | 12/2007 | Werni et al. | |
| 2010/0242451 A1 | | 9/2010 | Werni et al. | |

(Continued)

FOREIGN PATENT DOCUMENTS

| | | |
|---|---|---|
| DE | 10 2014 202 727 A1 | 8/2014 |
| DE | 10 2014 108877 A1 | 12/2015 |

(Continued)

*Primary Examiner* — Tom P Duong
(74) *Attorney, Agent, or Firm* — McGlew and Tuttle, P.C.

(57) ABSTRACT

An exhaust gas treatment device, especially for an exhaust system of an internal combustion engine of a vehicle, includes a housing (12) elongated in a direction of a housing longitudinal axis (L). An exhaust gas treatment unit (18) is arranged in the housing (12). At least one first exhaust gas guiding device (24) is in flow connection with an axially open axial end area (16) of the housing (12). The first exhaust gas guiding device (24) provides a first flow path area (38) extending along an outer side (22) of the housing (12) as well as a second flow path area (47) connecting the first flow path area (38) with the axially open axial end area (16) of the housing (12).

20 Claims, 4 Drawing Sheets

(56) References Cited

U.S. PATENT DOCUMENTS

| | | | |
|---|---|---|---|
| 2011/0167807 A1* | 7/2011 | Mitsuda | F01N 3/0211 60/311 |
| 2015/0377110 A1 | 12/2015 | Sandberg et al. | |
| 2017/0159526 A1 | 6/2017 | Middelmann | |

FOREIGN PATENT DOCUMENTS

| | | |
|---|---|---|
| EP | 1 736 645 A1 | 12/2006 |
| EP | 1 857 651 A2 | 11/2007 |
| EP | 2 233 709 A1 | 9/2010 |
| JP | 2008 215286 A | 9/2008 |
| WO | 2004/063540 A1 | 7/2004 |
| WO | 2014/167353 A1 | 10/2014 |

* cited by examiner

EXHAUST GAS TREATMENT DEVICE

CROSS REFERENCE TO RELATED APPLICATIONS

This application claims the benefit of priority under 35 U.S.C. § 119 of German Application 10 2016 122 769.2, filed Nov. 25, 2016, the entire contents of which are incorporated herein by reference.

FIELD OF THE INVENTION

The present invention pertains to an exhaust gas treatment device, which can be used in an exhaust system of an internal combustion engine of a vehicle in order to reduce the percentage of pollutants in the exhaust gas discharged by the internal combustion engine. Such an exhaust gas treatment device comprises an exhaust gas treatment unit, which may comprise, for example, a catalytic converter assembly unit or/and a particle filter assembly unit.

BACKGROUND OF THE INVENTION

Such exhaust gas treatment devices have, in principle, the problem that the treatment volume, i.e., especially the volume of the exhaust gas treatment unit, shall be increased for an increasingly better exhaust gas treatment, while, on the other hand, the space available for installing such exhaust gas treatment devices in vehicles decreases.

SUMMARY OF THE INVENTION

An object of the present invention is to provide an exhaust gas treatment device, especially for an exhaust system of an internal combustion engine of a vehicle, which provides a large treatment volume for exhaust gas flowing through same while having a compact configuration.

This object is accomplished according to the present invention by an exhaust gas treatment device, especially for an exhaust system of an internal combustion engine of a vehicle, comprising a housing elongated in the direction of a housing longitudinal axis, an exhaust gas treatment unit arranged in the housing as well as at least one first exhaust gas guiding device, which is in flow connection with an axially open axial end area of the housing, wherein the first exhaust gas guiding device provides a first flow path area extending along an outer side of the housing as well as a second flow path area connecting the first flow path area with the axially open axial end area of the housing.

Since the exhaust gas is guided to or from the exhaust gas treatment unit arranged in the housing along the outer side of the housing in some areas in the configuration of an exhaust gas treatment device according to the present invention, the volume provided in the interior of the housing can be used essentially completely for the exhaust gas treatment unit.

A compact configuration is facilitated by the fact that the first flow path area is routed essentially in the direction of the housing longitudinal axis along the outer side of the housing or/and that the first flow path area has a first axial end area, which is arranged in the axial area of the axially open axial end area of the housing, or/and a second axial end area arranged axially in the area of another axial end area of the housing.

To make it possible to achieve guiding of exhaust gas along the outer side of the housing with simple means, it is proposed that the exhaust gas guiding device comprise a first exhaust gas guide element arranged on the outer side of the housing, wherein the first flow path area is defined by the first exhaust gas guide element in at least some areas. It should be noted here that the arrangement of an exhaust gas guide element on the outer side of the housing does not necessarily mean that this exhaust gas guide element is fixed to the housing itself or is in contact with same.

Provisions may be made in an especially compact configuration for the first exhaust gas guide element to be fixed on the outer side of the housing and for the first flow path area to be defined essentially by the first exhaust gas guide element and the housing.

A second exhaust gas guide element may be fixed on the outer side of the housing in an embodiment variant that is advantageous especially in respect to the thermal load of the housing and of the exhaust gas treatment unit arranged therein, wherein the first exhaust gas guide element is fixed on the second exhaust gas guide element or/and on the outer side of the housing, and the first flow path area is defined essentially by the first exhaust gas guide element and the second exhaust gas guide element.

To make it possible to establish a flow connection from the first flow path area into the housing in a simple and compact manner, it is proposed that a third flow guide element, which is preferably essentially hood-like, closes the axially open axial end area of the housing and defines the second flow path area in at least some areas, be provided.

To connect the two flow path areas to one another, the third flow guide element may project radially outwardly over the housing in a circumferential area of the housing for connecting the second flow path area with the first axial end area of the first flow path area. Provisions may now be made, in particular, for the third exhaust guide element to radially cover the first exhaust gas guide element and the axially open axial end area of the housing.

To connect the exhaust gas treatment device with the system areas of an exhaust system, which system areas adjoin same, it is proposed that a flow guide pipe opening into the first flow path area in the second axial end area of the first flow path area be provided.

To guarantee the possibility of flow through the housing, provisions may be made for the housing to have two axially open axial end areas and for providing, in association with at least one of the two axial end areas of the housing, a first exhaust gas guiding device that is in flow connection with this axial end area.

A second exhaust gas guiding device may be provided in association with one of the two axial end areas of the housing, wherein the second exhaust gas guiding device may comprise a preferably essentially funnel-shaped fourth flow guide element, which closes this axial end area of the housing. The first exhaust gas guiding device may be arranged, for example, upstream of the exhaust gas treatment unit, and the second exhaust gas guiding device may be arranged downstream of the exhaust gas treatment unit. The flow direction may also be reversed, so that the first exhaust gas guiding device is arranged downstream of the exhaust gas treatment unit and the second exhaust gas guiding device is arranged upstream of the exhaust gas treatment unit.

It is provided for a symmetrical configuration, which is essential concerning the flow through the housing, that a respective first exhaust gas guiding device that is in flow connection with the housing be provided in association with each of the axial end areas of the housing.

To make it possible to achieve efficient exhaust gas treatment, it is further proposed that the exhaust gas treatment unit comprise a catalytic converter assembly unit or/and a particle filter assembly unit.

The present invention further pertains to an exhaust system for an internal combustion engine of a vehicle, comprising an exhaust gas treatment device according to the present invention, through which flow is possible in an exhaust gas flow direction.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
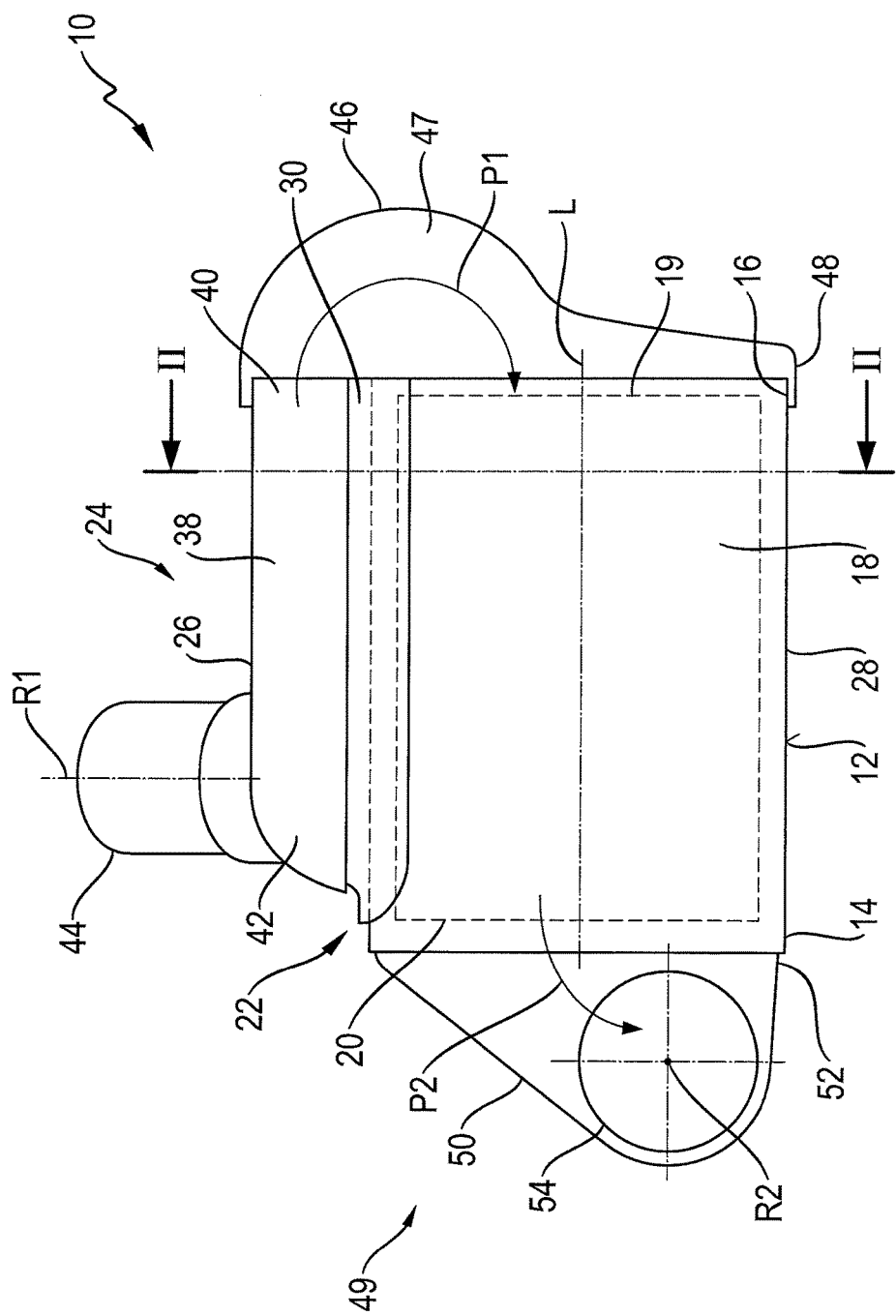
FIG. 1 is a side view of an exhaust gas treatment device.
Figure 2:
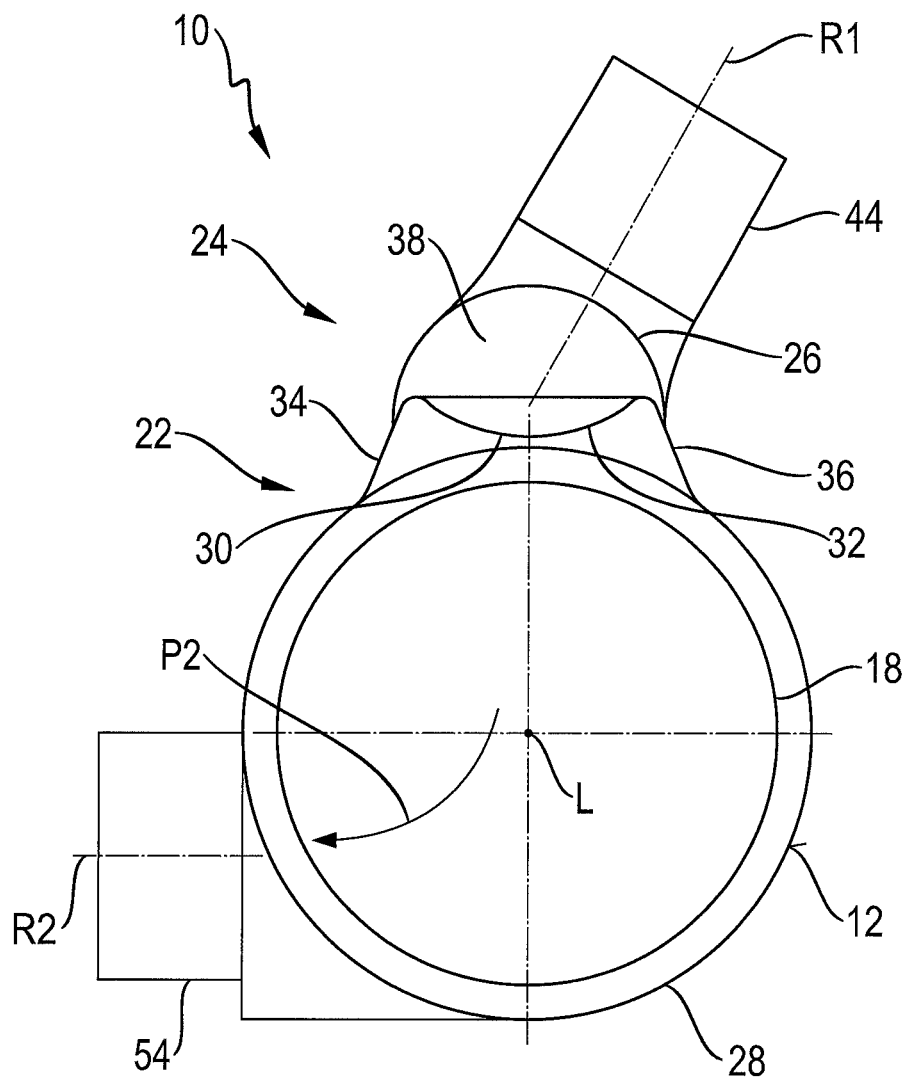
FIG. 2 is a sectional view showing the exhaust gas treatment device according to FIG. 1, cut along a line II-II in FIG. 1.

Referring to the drawings, FIGS. 1 and 2 show a first embodiment of an exhaust gas treatment device, which is generally designated by 10 and can be integrated in an exhaust system of an internal combustion engine of a vehicle. The exhaust gas treatment device 10 comprises a tubular, essentially cylindrical housing 12, which is elongated in the direction of a housing longitudinal axis L. The housing 12 is basically open axially in the direction of the housing longitudinal axis L at its two axial end areas 14, 16. An exhaust gas treatment unit generally designated by 18, which may comprise, for example, a catalytic converter assembly unit or/and a particle filter assembly unit, is arranged in the interior of the housing 12. The exhaust gas treatment unit 18 may be held in the housing 12, for example, via the intermediary of a mat, which surrounds said exhaust gas treatment unit and consists of a fiber material, so that an incoming flow side 19 of the exhaust gas treatment unit 18 is located in the area of the axial end area 16 of the housing 12 and an outgoing flow side 20 is positioned in the area of the axial end area 14 of the housing 12.

A first exhaust gas guiding device, which is generally designated by 24 and via which exhaust gas discharged by the internal combustion engine is introduced into the interior of the housing 12, is provided on an outer side 22 of the housing 12. The first exhaust gas guiding device 24 comprises a half shell-shaped first exhaust gas guide element 26, which is arranged on the outer side 22 of the housing 12 and extends essentially in the direction of the housing longitudinal axis L. The first exhaust gas treatment device 24 further comprises a second exhaust gas guide element 30, which is arranged on the outer side 22 of the housing 12 and is connected to an outer circumferential surface 28 of the housing 12 preferably by connection in substance, for example, by welding. In an area that is a central area in the circumferential direction, the second exhaust gas guide element 30 has an area 32 arched in a concave or shell-like shape and, adjoining it in the circumferential direction, respective leg areas 34, 36, with which this exhaust gas guide element 30 is fixed on the outer circumferential surface 28 of the housing 12. The first exhaust gas guide element 26 is fixed on these leg areas 34, 36 preferably by connection in substance, for example, by welding, so that the two exhaust gas guide elements 26, 30 together define a first flow path area 38 extending along the outer side 22 essentially in the direction of the housing longitudinal axis L. A first axial end area 40 of the first flow path area 38 is located axially in the area of the axial end area 16 of the housing 12. A second axial end area 42 of the first flow path area 38 is located axially in the area of the axial end area 14 of the housing 12. A flow guide pipe 44 opens in the area of this second axial end area 42 into the first flow path area 38, and longitudinal axis R1 of the flow guide pipe 44 may be, for example, essentially at right angles to the direction in which the first flow path area 38 extends along the outer side 22 of the housing 12. As an alternative, the longitudinal axis R1 may also be arranged at an angle different from 90° in relation to the direction in which the first flow path area 38 extends, or such that the flow guide pipe 44 axially extends the flow path area 38.

Due to the provision of the two flow guide elements 26, 30, which together essentially define the first flow path area, the exhaust gas being delivered in the direction of the housing 12 is guided along the outer side 22 of the housing 12 without essential thermal contact with this housing, so that an excessive thermal load on the exhaust gas treatment unit 18 can be avoided in this circumferential area.

A third flow guide element 46 having an essentially cap-like configuration is arranged at the axial end area 16 of the housing 12. The third flow guide element 46 covers the axial end area 16 of the housing 12 and the first axial end area of the first flow path area 38 and the two flow guide elements 26, 30 in this area and thus provides a gas-tight closure as well as a second flow path area 47 for establishing a flow connection between the first flow path area 38 and the axially open axial end area 16 of the housing 12. As is indicated by a flow arrow P1, the exhaust gas flowing through the first flow path area 38 and leaving this at the first axial end area 40 thereof is deflected by approximately 180°, so that it flows towards the incoming flow side 19 of the exhaust gas treatment device 18. The third exhaust gas guide element 46 can be fixed with a cylindrical section extending over the housing 12 and over the two flow guide elements 26, 30 on the outer side of these components preferably by connection in substance, for example, by welding.

A fourth flow guide element 50 providing a second exhaust gas guiding device 49 is fixed on the housing 12, preferably by connection in substance, for example, by welding, in the area of the axial end area 14 of the housing 12. An essentially cylindrical section 52 of the fourth flow guide element 50, which has, for example, an essentially hood-like shape, can be inserted into and fixed on the axial end area 14 of the housing 12. A flow guide pipe 54 opens into the fourth flow guide element 50, and a longitudinal axis R2 of the flow guide pipe 54 may be directed approximately at right angles to the direction of the housing longitudinal axis L, so that the two longitudinal axes R1, R2 of the flow guide pipes 44, 54 are positioned at an angle in relation to one another. The exhaust gas leaving the housing 12 at the axial end area 14 thereof is deflected, as is indicated by a flow arrow P2, by approximately 90° in the fourth flow guide element 50 before it enters the flow guide pipe 54. The flow guide pipe 54 could also be arranged such that a deflection by an angle different from 90° takes place or no deflection essentially takes place, so that the flow guide pipe 54 passes on the exhaust gases flowing through it essentially in the direction of the housing longitudinal axis L.

A compact mode of construction of the exhaust gas treatment device 10, in which a comparatively large volume is nevertheless provided for the exhaust gas treatment unit 18, is obtained with the above-described configuration. Due to a corresponding configuration of the first flow guide element 26, on the one hand, and due to the selection and positioning of the fourth flow guide element 50, on the other hand, the direction in which the longitudinal axes R1, R2 extend can be selected freely in broad angle ranges, so that an adaptation of the configuration to many different exhaust systems is easily possible.

Further, an arrangement corresponding to the first exhaust gas guiding device 24 with the flow guide elements 26, 30, 46 may also be provided in association with the axial end area 14 of the housing 12. Further, the flow direction in which exhaust gas flows through the housing 12 and the exhaust gas treatment unit 18 arranged therein may also be reversed in relation to the above-described flow direction, so that exhaust gas enters the housing 12 in the area of the axial end area 14 and leaves this in the area of the axial end area 16.

Figure 3:
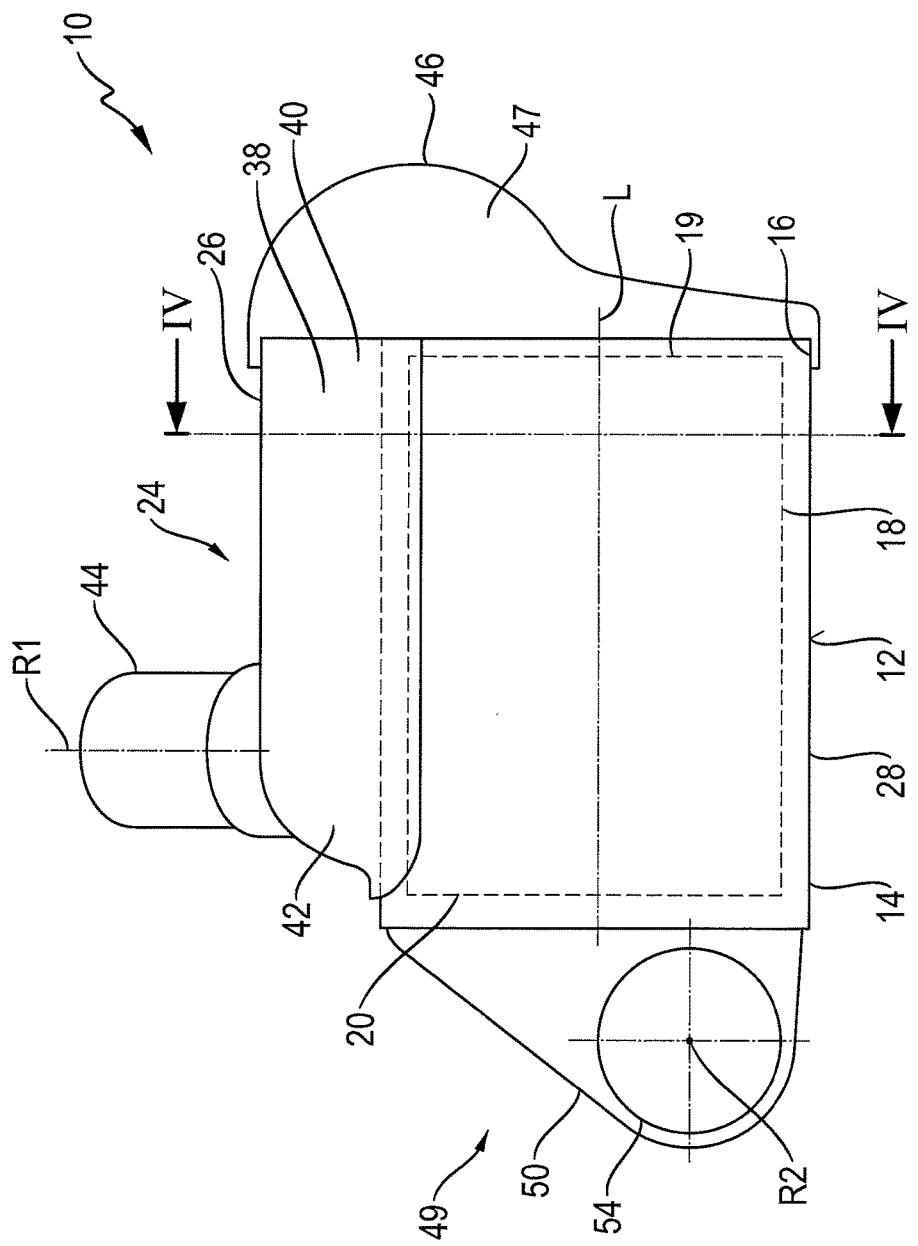
FIG. 3 is a side view of an alternative type of embodiment, which view corresponds to FIG. 1.
Figure 4:
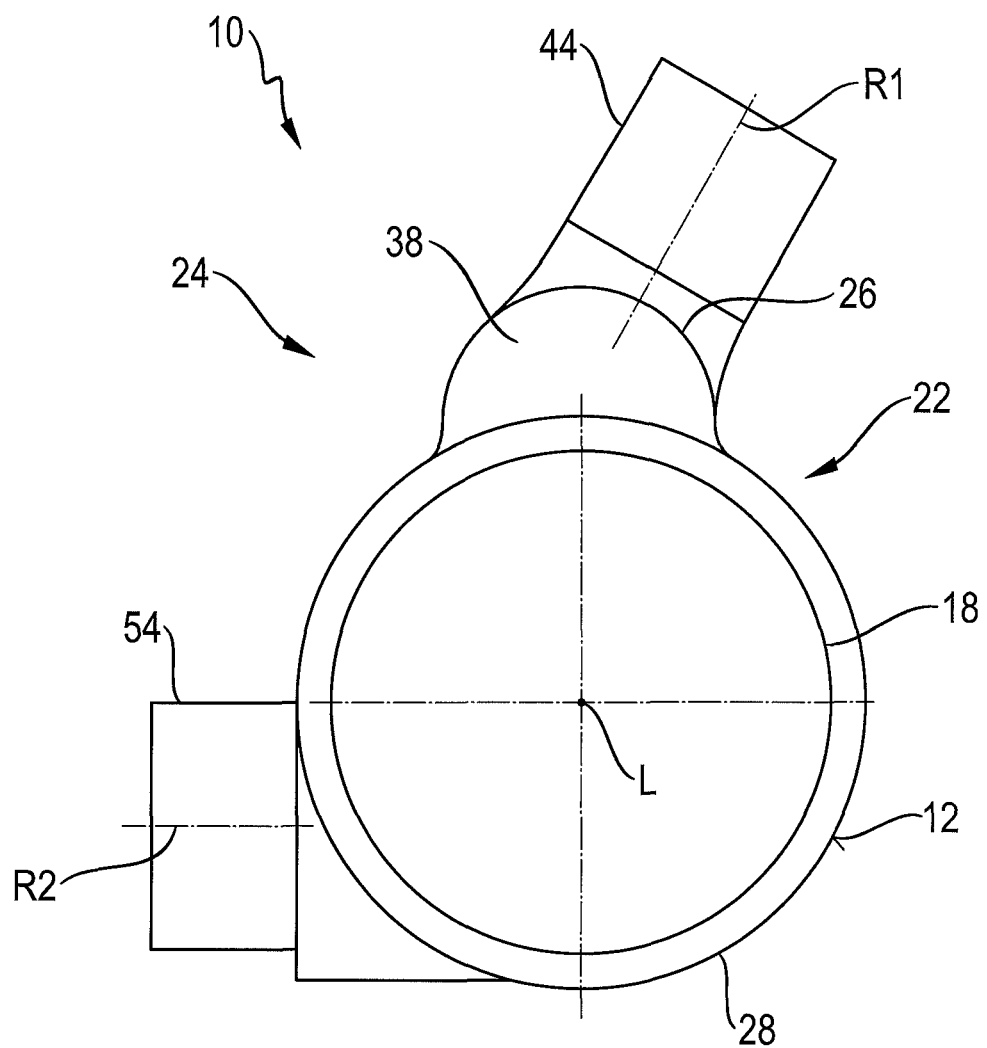
FIG. 4 is a sectional view showing the exhaust gas treatment device according to FIG. 3, cut along a line IV-IV in FIG. 3.

The exhaust gas treatment device 10 shown in FIGS. 3 and 4 differs from the above-described exhaust gas treatment device essentially in that the first exhaust gas guiding device 24 comprises only the two flow guide elements 26, 46. The first flow guide element 26 is fixed, extending along the outer side 22 of the housing 12, directly on the outer circumferential surface 28 preferably by connection in substance, for example, by welding, so that the first flow path area 38 is defined by the first flow guide element 26 and by a circumferential area of the housing 12. An even more compact configuration can thus be achieved with a smaller number of components.

It should finally be noted that the flow guide elements, the flow guide pipes and the housing may preferably be made of a sheet metal material in the above-described exhaust gas treatment device, which guarantees the possibility of easy shaping, on the one hand, and the possibility of connecting threes components to one another by connection in substance. At the same time, the risk of damage to these components due to overheating is nearly ruled out if these components are made of a sheet metal material.

While specific embodiments of the invention have been shown and described in detail to illustrate the application of the principles of the invention, it will be understood that the invention may be embodied otherwise without departing from such principles.

What is claimed is:

1. An exhaust gas treatment device for an exhaust system of an internal combustion engine of a vehicle, the exhaust gas treatment device comprising:
    a housing elongated in a direction of a housing longitudinal axis and with an axially open axial end area;
    an exhaust gas treatment unit arranged in the housing; and
    an exhaust gas guiding device in flow connection with the axially open axial end area of the housing, wherein the exhaust gas guiding device comprises a first flow path area extending along an outer side of the housing and a second flow path area connecting the first flow path area to the axially open axial end area of the housing, the first flow path area having a first axial end area arranged in an axial area of the axially open axial end area of the housing, the exhaust gas guiding device further comprising a hood flow guide element, which hood flow guide element closes the axially open axial end area of the housing and defines the second flow path area in at least some areas, wherein the hood flow guide element projects radially outwardly over the housing in a circumferential area of the housing and connects the second flow path area to the first axial end area of the first flow path area, the exhaust gas guiding device further comprising an exhaust gas guide element arranged on an outer side of the housing and the first flow path area being defined by the first exhaust gas guide element in at least some areas, the hood flow guide element radially overlapping the exhaust gas guide element and overlapping the axially open axial end area of the housing.

2. An exhaust gas treatment device in accordance with claim 1, wherein:
    the first flow path area guides a first flow essentially in the direction of the housing longitudinal axis along the outer side of the housing; or
    the first flow path area has a second axial end area arranged axially in an area of another axial end area of the housing; or
    any combination of the first flow path area guides a first flow essentially in the direction of the housing longitudinal axis along the outer side of the housing and the first flow path area has a second axial end area arranged axially in an area of another axial end area of the housing.

3. An exhaust gas treatment device in accordance with claim 2, further comprising a flow guide pipe opening into the first flow path area in a second axial end area of the first flow path area.

4. An exhaust gas treatment device in accordance with claim 1, wherein:
    the exhaust gas guide element is fixed on the outer side of the housing;
    the hood flow guide element comprises an inner surface, at least a portion of the inner surface being located opposite the axially open end area of the housing with respect to the housing longitudinal axis; and
    the first flow path area is defined essentially by the exhaust gas guide element and the housing.

5. An exhaust gas treatment device in accordance with claim 1, wherein the exhaust gas guiding device further comprises another exhaust gas guide element fixed on the outer side of the housing, wherein:
    the exhaust gas guide element is fixed on the another exhaust gas guide element or the exhaust gas guide element is fixed on the outer side of the housing or the exhaust gas guide element is fixed on the another exhaust gas guide element and is fixed on the outer side of the housing; and
    the first flow path area is defined essentially by the exhaust gas guide element and the another exhaust gas guide element.

6. An exhaust gas treatment device in accordance with claim 1, wherein:
    the exhaust gas guide element is fixed on the outer side of the housing; and
    the first flow path area is defined essentially by the exhaust gas guide element and the housing.

7. An exhaust gas treatment device in accordance with claim 1, wherein:

the housing comprises another axially open axial end area to provide two axially open axial end areas; and the exhaust gas guiding device comprises an exhaust gas guide element in flow connection with th another axial end area.

8. An exhaust gas treatment device in accordance with claim 7, further comprising another exhaust gas guiding device, wherein:

the another exhaust gas guiding device is provided in association with one of the two axial end areas of the housing;

the another exhaust gas guiding device comprises an essentially funnel flow guide element closing said one of the two axial end areas of the housing.

9. An exhaust gas treatment device in accordance with claim 8, wherein the exhaust gas guiding device is arranged upstream of the exhaust gas treatment unit; and the another exhaust gas guiding device is arranged downstream of the exhaust gas treatment unit.

10. An exhaust gas treatment device in accordance with claim 8, wherein the exhaust gas guiding device is arranged downstream of the exhaust gas treatment unit; and the another exhaust gas guiding device is arranged upstream of the exhaust gas treatment unit.

11. An exhaust gas treatment device in accordance with claim 1, wherein:

the housing comprises another axially open axial end areas to provide two axially open axial end areas; and the exhaust gas guiding device is in flow connection with each of the axial end areas.

12. An exhaust gas treatment device in accordance with claim 1, wherein the exhaust gas treatment unit comprises a catalytic converter assembly unit or a particle filter assembly unit or both a catalytic converter assembly unit and a particle filter assembly unit.

13. An exhaust gas treatment device in accordance with claim 1, wherein at least a portion of the hood flow guide element is located axially opposite the axially open end area with respect to the housing longitudinal axis.

14. An exhaust system for an internal combustion engine of a vehicle, the exhaust system comprising an exhaust gas treatment device through which flow is in an exhaust gas flow direction, the exhaust gas treatment device comprising:

a housing elongated in a direction of a housing longitudinal axis and with an axially open axial end area;

an exhaust gas treatment unit arranged in the housing; and an exhaust gas guiding device in flow connection with the axially open axial end area of the housing, wherein the exhaust gas guiding device comprises a first flow path area extending along an outer side of the housing and a second flow path area connecting the first flow path area to the axially open axial end area of the housing, the first flow path area having a first axial end area arranged in an axial area of the axially open axial end area of the housing, the exhaust gas guiding device further comprising a hood flow guide element, which hood flow guide element closes the axially open axial end area of the housing and defines the second flow path area in at least some areas, wherein the hood flow guide element projects radially outwardly over the housing in a circumferential area of the housing and connects the second flow path area to the first axial end area of the first flow path area, the exhaust gas guiding device further comprising an exhaust gas guide element arranged on an outer side of the housing and the first flow path area being defined by the first exhaust gas guide element in at least some areas, the hood flow guide element radially overlapping the exhaust gas guide element and overlapping the axially open axial end area of the housing.

15. An exhaust system in accordance with claim 14, wherein:

the first flow path area guides a first flow essentially in the direction of the housing longitudinal axis along the outer side of the housing or the first flow path area has a second axial end area arranged axially in an area of another axial end area of the housing; or any combination of the first flow path area guides a first flow essentially in the direction of the housing longitudinal axis along the outer side of the housing and the first flow path area has a second axial end area arranged axially in an area of another axial end area of the housing.

16. An exhaust system in accordance with claim 14, wherein the exhaust gas guiding device further comprises another exhaust gas guide element fixed on the outer side of the housing, wherein:

the exhaust gas guide element is fixed on the another exhaust gas guide element or the exhaust gas guide element is fixed on the outer side of the housing or the exhaust gas guide element is fixed on the another exhaust gas guide element and is fixed on the outer side of the housing; and the first flow path area is defined essentially by the exhaust gas guide element and the another exhaust gas guide element.

17. An exhaust system in accordance with claim 14, wherein at least a portion of the hood flow guide element is located axially opposite the axially open end area with respect to the housing longitudinal axis.

18. An exhaust gas treatment device for an exhaust system of an internal combustion engine of a vehicle, the exhaust gas treatment device comprising:

a housing comprising a housing longitudinal axis and an axial end portion, the housing being elongated in a direction of the housing longitudinal axis, the axial end portion defining an axially open end area;

an exhaust gas treatment unit arranged in the housing; and an exhaust gas guiding device in flow connection with the axially open axial end area of the housing, wherein the exhaust gas guiding device comprises a first flow path area extending along an outer side of the housing and a second flow path area connecting the first flow path area to the axially open axial end area of the housing, the first flow path area having a first axial end area arranged in an axial area of the axially open axial end area of the housing, the exhaust gas guiding device further comprising a hood flow guide element, at least a portion of the hood flow guide element being located axially opposite the axially open end with respect to the housing longitudinal axis area, wherein the hood flow guide element defines an axial end of the housing and defines the second flow path area in at least some areas, wherein at least another portion of the hood flow guide element projects radially outwardly over the housing in a circumferential area of the housing and connects the second flow path area to the first axial end area of the first flow path area, the exhaust gas guiding device further comprising an exhaust gas guide element arranged on an outer side of the housing and the first flow path area being defined by the first exhaust gas guide element in at least some areas, the hood flow guide element radially overlapping the exhaust gas guide element and overlapping the axially open axial end area of the housing.

19. An exhaust gas treatment device in accordance with claim 18, wherein the axial end portion extends parallel to the housing longitudinal axis.

20. An exhaust gas treatment device in accordance with claim 18, wherein the hood flow guide elements seals the axially open axial end area of the housing.

* * * * *